US008159931B2

United States Patent
Manakkal et al.

(10) Patent No.: US 8,159,931 B2
(45) Date of Patent: Apr. 17, 2012

(54) ORTHOGONAL PILOT CODE CONSTRUCTION

(75) Inventors: Rajesh Raja Manakkal, Santa Clara, CA (US); Leena Zacharias, Santa Clara, CA (US); Louay Jalloul, Santa Clara, CA (US)

(73) Assignee: Broadcom Corporation, Irvine, CA (US)

( * ) Notice: Subject to any disclaimer, the term of this patent is extended or adjusted under 35 U.S.C. 154(b) by 439 days.

(21) Appl. No.: 12/316,529

(22) Filed: Dec. 11, 2008

(65) Prior Publication Data

US 2009/0147668 A1    Jun. 11, 2009

Related U.S. Application Data

(60) Provisional application No. 61/007,176, filed on Dec. 11, 2007, provisional application No. 61/007,181, filed on Dec. 11, 2007.

(51) Int. Cl.
*H04J 11/00* (2006.01)

(52) U.S. Cl. ....................................... 370/208

(58) Field of Classification Search .................. 370/203, 370/204, 208; 455/403, 422.1, 436, 450
See application file for complete search history.

(56) References Cited

U.S. PATENT DOCUMENTS

| | | | | |
|---|---|---|---|---|
| 7,738,530 | B2 * | 6/2010 | Thomas | 375/140 |
| 7,782,807 | B2 * | 8/2010 | Yoon et al. | 370/312 |
| 2008/0039107 | A1 * | 2/2008 | Ma et al. | 455/450 |
| 2008/0101441 | A1 * | 5/2008 | Palanki et al. | 375/146 |
| 2008/0112308 | A1 * | 5/2008 | Cleveland | 370/204 |
| 2008/0125048 | A1 * | 5/2008 | Pi | 455/63.1 |
| 2008/0130559 | A1 * | 6/2008 | Pi | 370/329 |
| 2008/0130612 | A1 * | 6/2008 | Gorokhov et al. | 370/342 |
| 2008/0144582 | A1 * | 6/2008 | Das et al. | 370/335 |
| 2009/0213950 | A1 * | 8/2009 | Gorokhov et al. | 375/260 |
| 2009/0264142 | A1 * | 10/2009 | Sankar et al. | 455/501 |
| 2010/0040159 | A1 * | 2/2010 | Lee et al. | 375/260 |

* cited by examiner

*Primary Examiner* — Chi Pham
*Assistant Examiner* — Robert Lopata
(74) *Attorney, Agent, or Firm* — Sterne, Kessler, Goldstein & Fox P.L.L.C.

(57) ABSTRACT

A method, system and apparatus for communication in an Orthogonal Frequency Division Multiplexing (OFDM) communication system is provided. The method includes allocating a plurality of sequences to a plurality of sectors in the OFDMA communication system. The plurality of sequences are orthogonal to each other. The method further includes communicating one or more OFDM tiles between one or more MSs in one or more sectors of the plurality of sectors and one or more BSs of the one or more sectors. The one or more OFDM tiles include one or more sequences of the plurality of sequences allocated to the one or more sectors.

18 Claims, 13 Drawing Sheets

ORTHOGONAL PILOT CODE CONSTRUCTION

CROSS-REFERENCE TO RELATED APPLICATION

This application claims the benefit of U.S. Provisional Application Patent Application Nos. 61/007,176 and 61/007,181; both filed on Dec. 11, 2007, which is incorporated by reference in its entirety herein.

FIELD OF THE INVENTION

The invention generally relates to communication systems. More specifically, the invention relates to a method and system for wireless communication in an Orthogonal Frequency Division Multiple Access (OFDMA) communication system. The transmission in the OFDMA communication system is based on Orthogonal Frequency Division Multiplexing (OFDM).

BACKGROUND OF THE INVENTION

Orthogonal Frequency Division Multiplexing (OFDM) offers several advantages including, but not limited to, high spectral efficiency and improved immunity to multi-path fading. Consequently, OFDM is widely used in modern wireless communication systems for providing services including, but not limited to, digital audio broadcasting, digital video broadcasting and broadband internet access.

In order to provide communication services to users spread over large geographical regions, modern wireless communication systems use a cellular architecture. In the cellular architecture, a geographical region is divided into a number of sub-regions called cells. Each cell is served by a Base Station (BS). In other words, a BS of a cell provides communication services to Mobile Stations (MSs) inside the cell.

Further, for efficient utilization of resources, a cell is divided into a plurality of sectors. For example, a cell may be divided into three or more sectors. A BS of the cell serves each sector of the cell by using a set of directional antennas corresponding to each sector. The use of directional antennas permits re-use of frequency bands among sectors of the cell. Alternatively, each sector of the cell may be served by a dedicated BS.

However, since frequencies are re-used across sectors of a cell, there is a finite possibility of interference between MSs in adjacent sectors of the cell in spite of using directional antennas. In a scenario, reception of a signal at a BS in a sector from a first MS served by the BS may experience interference from a second MS served by a BS of an adjacent sector. For example, the first MS may transmit an OFDM tile embedded with a Pseudo Random Binary Sequence (PRBS). The OFDM tile includes one or more of one or more pilot sub-carriers and one or more data sub-carriers. Further, a PRBS may be embedded in the one or more pilot sub-carriers. However, the received OFDM tile may include interfering components from an OFDM tile transmitted by the second MS. This is illustrated by the following equations.

$$y_{11} = c^{(1)}_{11} h + c^{(2)}_{11} g + n_{11} \quad (1)$$

$$y_{13} = c^{(1)}_{13} h + c^{(2)}_{13} g + n_{13} \quad (2)$$

$$y_{41} = c^{(1)}_{41} h + c^{(2)}_{41} g + n_{41} \quad (3)$$

$$y_{43} = c^{(1)}_{43} h + c^{(2)}_{43} g + n_{43} \quad (4)$$

where, $y_{ij}$ is the signal received by the BS at $i^{th}$ sub-carrier (pilot sub-carrier) and $j^{th}$ time symbol of the OFDM tile, $c^{(k)}_{ij}$ is a pseudo random binary value corresponding to $i^{th}$ sub-carrier and $j^{th}$ time symbol in the PRBS corresponding to sector k, h is the channel between the first MS and the BS, which is constant throughout the OFDM tile, g is the channel between the second MS and the BS, which is constant throughout the OFDM tile, and $n_{i,j}$ is the noise in the channel at $i^{th}$ sub-carrier and $j^{th}$ time symbol.

Further, the channel h may be estimated based on the signal received by the BS. An estimation of channel h, represented by $h_{est}$, using linear averaging is given by:

$$h_{est} = \left( \sum_{ij} y_{ij} c^{(1)}{ij} \right) / 4 \quad (5)$$

$$= h + \left[ \left( \sum_{ij} c(1)_{ij} c(2)_{ij} \right) / 4 \right] g + \left( \sum_{ij} n_{ij} \right) / 4 \quad (6)$$

The PRBS corresponding to the sector is generated independent of the PRBS corresponding to an adjacent sector. Further, the PRBS may include values of one or more of +1 and −1. Therefore, the estimation of channel h is given by:

$$h_{est} = \begin{cases} h + g + \left( \sum_{ij} n_{ij} \right) / 4 & \text{with probability } 1/16 \\ h + g/2 + \left( \sum_{ij} n_{ij} \right) / 4 & \text{with probability } 4/16 \\ h + \left( \sum_{ij} n_{ij} \right) / 4 & \text{with probability } 6/16 \\ h - g/2 + \left( \sum_{ij} n_{ij} \right) / 4 & \text{with probability } 4/16 \\ h - g + \left( \sum_{ij} n_{ij} \right) / 4 & \text{with probability } 1/16 \end{cases} \quad (7)$$

It can be observed that the probability of maximum interference from the second MS is 2/16. Further, in spite of linear averaging, the probability of partial interference is 8/16. Hence, the use of PRBS does not completely mitigate interference from MSs served by BSs of adjacent sectors.

Therefore, there is a need for new sequences, for embedding in pilot sub-carriers of an OFDM tile, which improve the channel estimation between MSs and BSs.

BRIEF DESCRIPTION OF THE FIGURES

The accompanying figures where like reference numerals refer to identical or functionally similar elements throughout the separate views and which together with the detailed description below are incorporated in and form part of the specification, serve to further illustrate various embodiments and to explain various principles and advantages all in accordance with the invention.

Figure 1:
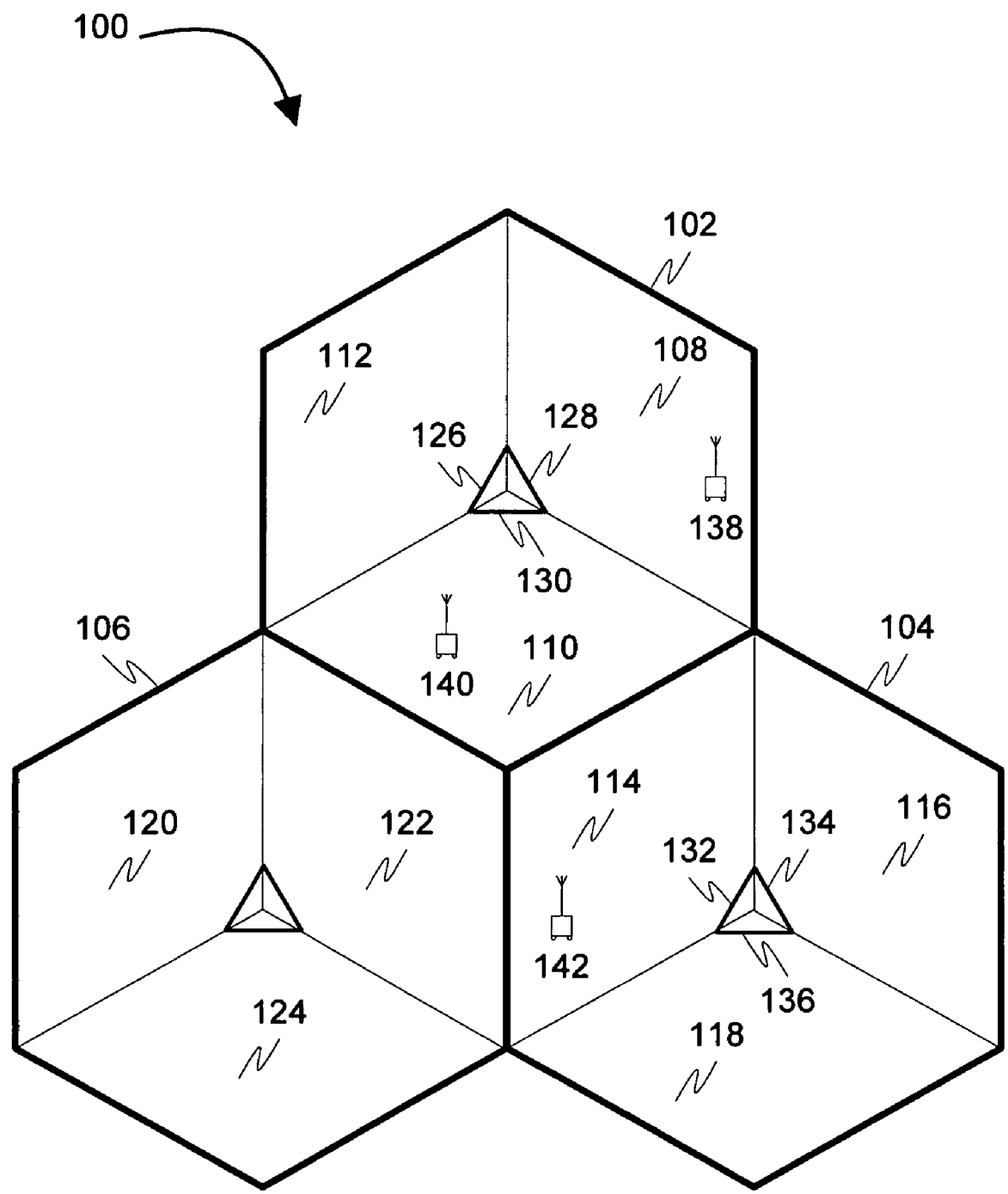
FIG. 1 illustrates a communication system (that is exemplary) in which various embodiments of the invention may function. Transmission in the communication system is based on Orthogonal Frequency Division Multiple Access (OFDMA).

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the invention.

DETAILED DESCRIPTION OF THE INVENTION

Before describing in detail embodiments that are in accordance with the invention, it should be observed that the embodiments reside primarily in combinations of method steps and apparatus components related to communication in an orthogonal frequency division multiple Access (OFDMA) communication system. Accordingly, the apparatus components and method steps have been represented where appropriate by conventional symbols in the drawings, showing only those specific details that are pertinent to understanding the embodiments of the invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

It will be appreciated that embodiments described herein may be comprised of one or more conventional processors and unique stored program instructions that control the one or more processors to implement, in conjunction with certain non-processor circuits, some, most, or all of the functions of method and apparatus for communication in an OFDMA communication system. The non-processor circuits may include, but are not limited to, a radio receiver, a radio transmitter, signal drivers, clock circuits, power source circuits, and user input devices.

Various embodiments of the invention provide method, system and apparatus for communication in an OFDMA communication system. The method includes allocating a plurality of sequences to a plurality of sectors in an OFDMA communication system. The plurality of sequences are orthogonal to each other. The method further includes communicating one or more OFDM tiles between one or more MSs in one or more sectors of the plurality of sectors and one or more BSs of the one or more sectors. The one or more OFDM tiles include one or more sequences of the plurality of sequences allocated to the one or more sectors.

FIG. 1 illustrates an OFDMA communication system 100 (that is exemplary) in which various embodiments of the invention may function. OFDMA communication system 100 includes a plurality of cells (for example, a cell 102, a cell 104, and a cell 106). Further, each cell includes a plurality of sectors. For example, cell 102 includes a sector 108, a sector 110, and a sector 112, and cell 104 includes a sector 114, a sector 116, and a sector 118. Similarly, cell 106 includes a sector 120, a sector 122, and a sector 124. It will be apparent to a person skilled in the art that the shape of a cell and the shape of a sector in FIG. 1 is representative and may be different from these representations.

In a cell of the plurality of cells, one or more Mobile Stations (MSs) in the cell are served by one or more Base Stations (BSs) in the cell. For example, in cell 102, a BS 126, a BS 128, and a BS 130 serve one or more MSs in cell 102. Similarly, in cell 104, a BS 132, a BS 134, and a BS 136 serve one or more MSs in cell 104. Further, MSs in a sector are served by a BS corresponding to the sector. For example, MS 138 in sector 108 is served by BS 128 and MS 140 in sector 110 is served by BS 130. Similarly, MS 142 in sector 114 is served by BS 132. It would be apparent to one skilled in the art that a MS in a sector served by a BS of the sector may be physically located in the sector. Alternatively, the MS in the sector may be physically located in an adjacent sector.

Further, two or more of the plurality of cells are adjacent to each other. For example, each of cell 104 and cell 106 is adjacent to cell 102. In other words, cell 102, and cell 104, and cell 106 are adjacent cells. Further, two or more of a plurality of sectors in a cell are adjacent to each other. For example, each of sector 110 and sector 112 is adjacent to sector 108. In other words, sector 108, sector 110, and sector 112 are adjacent sectors. Additionally, plurality of sectors across the plurality of cell may be adjacent to each other. For example, sector 110 in cell 102 and sector 114 in cell 104 are adjacent sectors. However, sector 108 in cell 102 and sector 116 in cell 104 are not adjacent sectors. Similarly, sector 108 and sector 114 in cell 104 are also not adjacent sectors.

Figure 2:
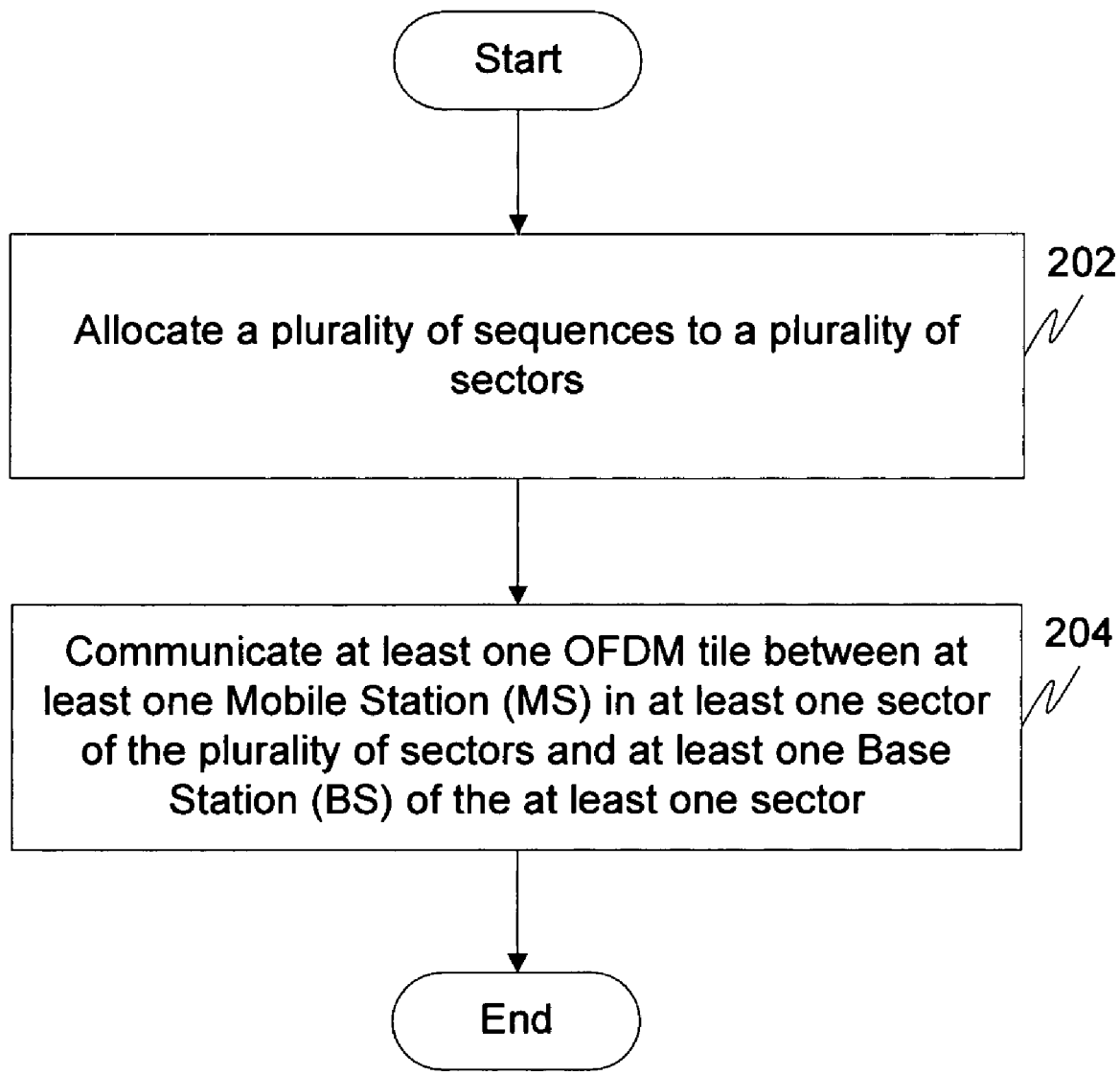
FIG. 2 is a flow chart of a method of communication in an OFDMA communication system, in accordance with an embodiment of the invention.
Figure 5:
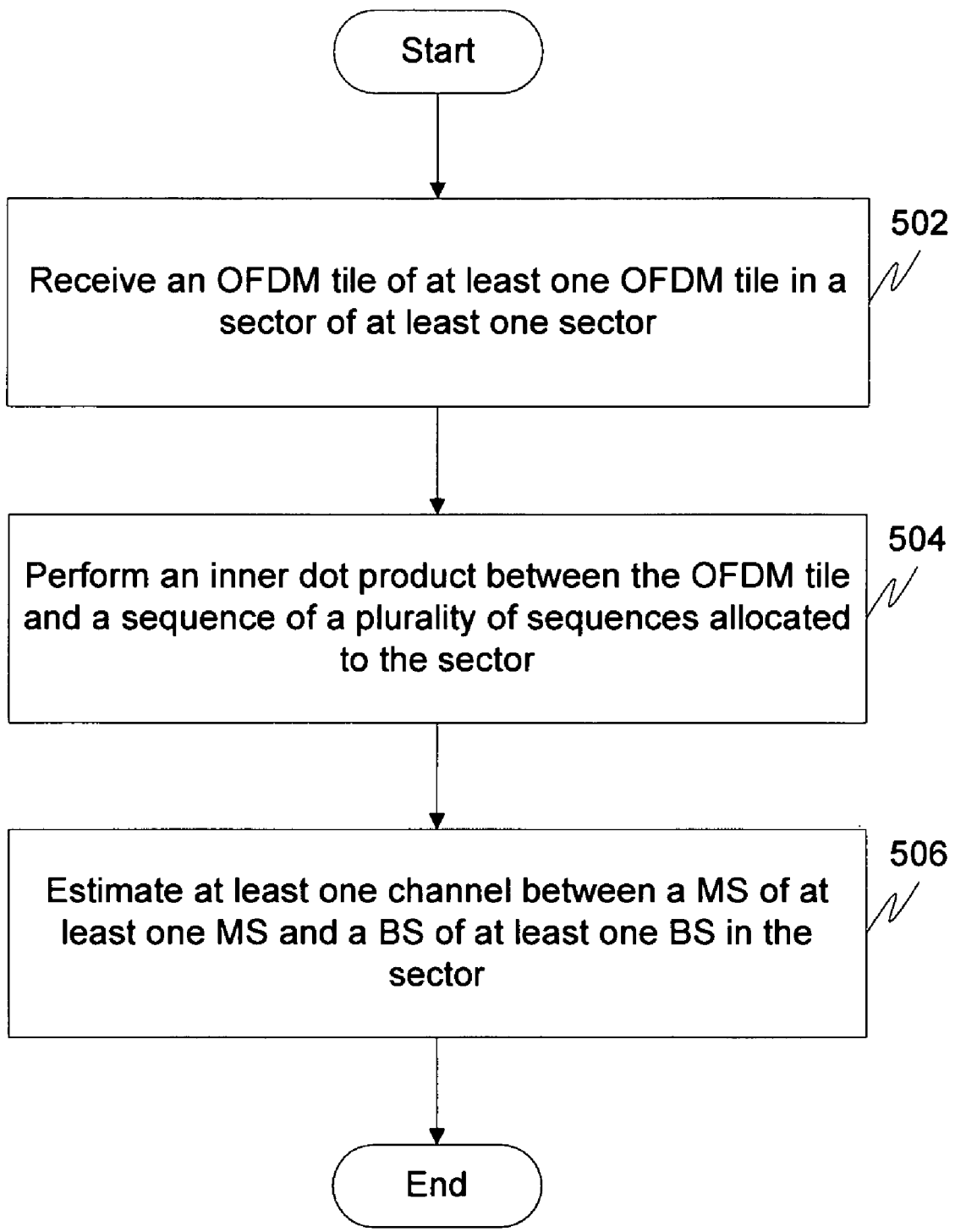
FIG. 5 is a flow chart of a method of estimating channel in an OFDMA communication system, in accordance with still another embodiment of the invention.

FIG. 2 is a flow chart illustrating a method of communication in OFDMA communication system 100, in accordance with an embodiment of the invention. OFDMA communication system 100 includes a plurality of cells. At step 202, a plurality of sequences are allocated to a plurality of sectors in OFDMA communication system. The plurality of sequences are orthogonal to each other. In other words, the inner product between any two sequences of the plurality of sequences is zero. The plurality of sequences are derived from a phase shift keying (PSK) constellation. The plurality of sequences may be derived from a set of Walsh-Hadamard orthogonal matrices. For example, the plurality of sequences may be the Walsh-Hadamard matrix: $[(1\ 1\ 1\ 1), (1\ -1\ 1\ -1), (1\ 1\ -1\ -1), (1\ -1\ -1\ 1)]^T$. For instance, the sequence (1 1 1 1) may be allocated to a first sector of the plurality of sectors, while the sequence (1 −1 1 −1) may be allocated to a second sector of the plurality of sectors. This is explained in detail in conjunction with FIG. 5 given below.

Further, the number of the plurality of sequences may be equal to the number of the plurality of sectors in a cell. Alternatively, the number of the plurality of sequences may be less than or greater than the number of the plurality of sectors in a cell. Further, the number of possible unique orthogonal sequences equals the number of symbols in the sequence. For example, if the number of symbols in a sequence of the plurality of sequences is eight, then eight unique orthogonal sequences can be derived. In other words, each sequence of the plurality of sequences includes eight symbols. In an embodiment of the invention, each of the plurality of sequences includes four symbols.

In an embodiment, a cell of the plurality of cells includes the plurality of sectors. In this case, the plurality of sequences are allocated to the plurality of sectors in the cell. For example, the plurality of sequences are allocated to sector 108, sector 110, and sector 112 in cell 102. Additionally, in this case, each sequence of the plurality of sequence is unique. Therefore, no two sectors in the cell have the same sequence. For example, sector 108 is allocated the sequence: (1 −1 1 −1), sector 110 is allocated the sequence: (1 1 −1 −1), and sector 112 is allocated the sequence: (1 −1 −1 1). This is further explained in detail in conjunction with an exemplary embodiment given in FIG. 8.

Figure 3:
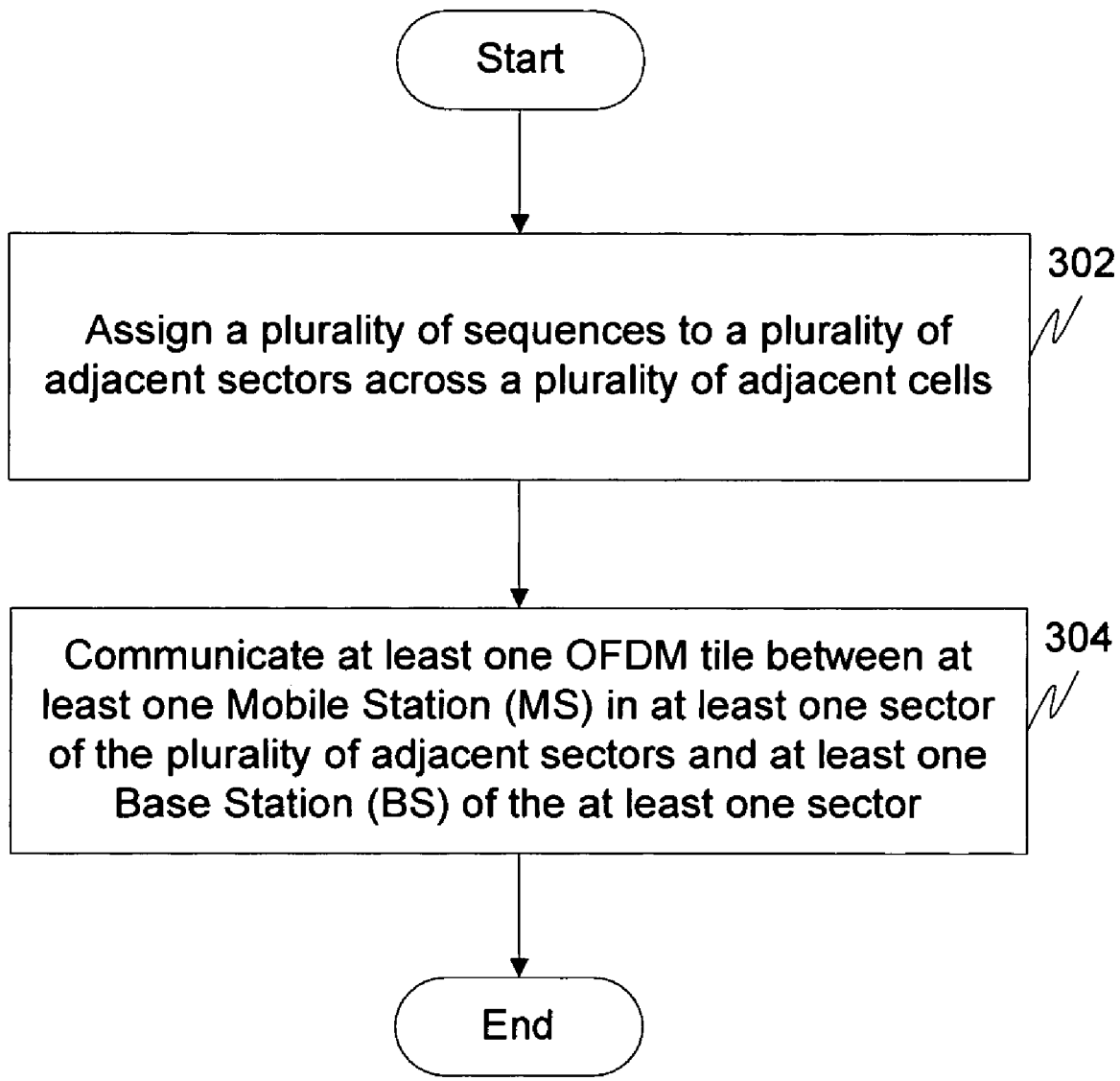
FIG. 3 is a flow chart of a method of communication in an OFDMA communication system, in accordance with another embodiment of the invention.

In another embodiment, the plurality of cells includes the plurality of sectors. In this case, the plurality of sequences are allocated to the plurality of sectors across the plurality of cells. For example, the plurality of sequences may be allocated to sector 108, sector 110, sector 112, sector 114, sector 116, sector 118, sector 120, sector 122, and sector 124 across cell 102, cell 104 and cell 106. Further, a plurality of adjacent cells may exist in the plurality of cells. In an embodiment, the plurality of sequences may be allocated to a plurality of adjacent sectors across the plurality of adjacent cells. Adjacent cells have been explained in conjunction with FIG. 1 given above. In this case, each sequence of the plurality of sequences is unique. This is explained further in detail in conjunction with FIG. 3 given below. In another embodiment, a plurality of sets of sequences may be selected from the plurality of sequences and are assigned to a set of cells of the plurality of cells. In this case, each of the plurality of sets of sequences is unique. This is explained further in detail in conjunction with FIG. 4.

In an embodiment of the invention, a sequence of the one or more sequences in an OFDM tile communicated from a MS of the one or more MSs to a BS of the one or more BSs is derived from one or more of a BS identification number and one or more BS broadcast information available to the MS. In another embodiment of the invention, a sequence of the one or more sequence in an OFDM tile communicated from a MS of the one or more MSs to a BS of the at least one BS is derived from a message received by the MS from the BS.

Further, in yet another embodiment, a MS of the one or more MSs moving from a serving sector of the one or more sectors to a target sector of the one or more sectors is assigned a sequence of the one or more sequences allocated to the target sector.

Subsequent to the allocation of the plurality of sequences, one or more OFDM tiles are communicated between one or more MSs in one or more sectors of the plurality of sectors and one or more BSs of the one or more sectors, at step 204. An OFDM tile of the one or more OFDM tiles may be one or more of an Up-link (UL) Partial Usage of Sub-channels (PUSC) tile and a down-link (DL) PUSC cluster compliant with IEEE 802.16e. Additionally, an OFDM tile of the one or more OFDM tiles may be one or more of an Up-link (UL) Band AMC (BAMC) tile and a down-link BAMC cluster compliant with IEEE 802.16e.

The one or more OFDM tiles include one or more sequences of the plurality of sequences allocated to the one or more sectors. In an embodiment, an OFDM tile of the one or more OFDM tiles includes one or more of a plurality of pilot sub-carriers and a plurality of data sub-carriers. In this case, a sequence of the one or more sequences may be embedded in the plurality of pilot sub-carriers. Additionally, the number of sequences in the plurality of sequences is equal to the number of pilot sub-carrier in the OFDM tile. Further, the number of symbols in each sequence of the one or more sequence is equal to the number of pilot sub-carriers in the OFDM tile. For example, a UL PUSC-tile includes four pilot sub-carriers and eight data sub-carriers. Therefore, a sequence of the one or more sequences is embedded in the four pilot sub-carriers. Further, in this example, the number of sequences in the plurality of sequences is four and the number of symbols in each sequence of the one or more sequences is four. As another example, a UL-BAMC tile includes six pilot sub-carriers. Accordingly, the number of sequences in the plurality of sequences is six. In an embodiment, a sequence of the plurality of sequences embedded in one or more of a UL-PUSC tile and DL-PUSC cluster is different from a sequence of the plurality of sequences embedded in one or more of a UL-BAMC tile and DL-BAMC cluster.

To further elaborate step 204 by way of an example, the sequence (1 1 1 1) is allocated to sector 108, and the sequence (1 −1 1 −1) is allocated to sector 110 in cell 102. Therefore, during a communication between MS 138 and BS 128 in sector 108, MS 138 communicates an OFDM tile, which includes the sequence (1 1 1 1), to BS 128. Similarly, during a communication between MS 140 and BS 130 in sector 110, MS 140 communicates an OFDM tile, which includes the sequence (1 −1 1 −1), to BS 130. As the sequence (1 1 1 1) and the sequence (1 −1 1 −1) are orthogonal, therefore, interference caused by MS 138 in the communication between MS 140 and BS 130 is minimized. Similarly, interference cause by MS 140 in the communication between MS 138 and BS 130 is minimized.

Therefore, allocating sequences which are orthogonal to each other to sectors in OFDMA communication system minimizes interference caused by MSs and BSs in adjacent sectors.

In an embodiment, in addition to allocation of the plurality of orthogonal sequences, a plurality of Pseudo Random Binary Sequences (PRBSs) may also be assigned to the plurality of cells. Each PRBS of the plurality of PRBSs assigned to a plurality of adjacent cells of the plurality of cells is unique. For example, in OFDMA communication system 100, a first PRBS is assigned to cell 102, a second PRBS is assigned to cell 104, and a third PRBS is assigned to cell 106.

In an embodiment, if the plurality of PRBSs are assigned to the plurality of cells, prior to communicating an OFDM tile of the one or more OFDM tiles in a cell of the plurality of cells, the OFDM tile is multiplied by a PRBSs allocated to the cell. The use of the plurality of PRBSs in addition to the plurality of sequences may help in mitigating effects of interference.

In an embodiment, based on the one or more OFDM tiles communicated between the one or more MSs and the one or more BSs, one or more channels are estimated between the one or more MSs and the one or more BSs. This is further explained in detail in conjunction with FIG. 5 given below.

FIG. 3 is a flow chart illustrating a method of communication in OFDMA communication system 100, in accordance with another embodiment of the invention. OFDMA communication system 100 includes a plurality of cells, which further includes a plurality of sectors. A plurality of adjacent cells exist in the plurality of cells. In other words, two or more cells in the plurality of cells are adjacent. At step 302, a plurality of sequences are assigned to a plurality of adjacent sectors across the plurality of adjacent cells.

The plurality of sequences assigned to the plurality of adjacent sectors are orthogonal to each other. In other words, the inner product between any two sequences of the plurality of sequences is zero. For example, the plurality of sequences may be derived from the Walsh-Hadamard matrix: [(1 1 1 1), (1 −1 1 −1), (1 1 −1 −1), (1 −1 −1 1)]$^T$. For instance, the sequence (1 1 1 1) may be allocated to a first adjacent sector of the plurality of adjacent sectors, while the sequence (1 −1 1 −1) may be allocated to a second adjacent sector of the plurality of adjacent sectors. Further, each of the plurality of sequences assigned to the plurality of adjacent sectors is unique. In other words, adjacent sectors belonging to adjacent cells are assigned different sequences. For example, sector 110, sector 114, and sector 122 are assigned sequence that are unique and are orthogonal to each other. Therefore, sector 110 is assigned the sequence (1 −1 −1 1), sector 114 is assigned the sequence (1 1 1 1), and sector 122 is assigned the sequence (1 1 −1 −1).

Thereafter, one or more OFDM tiles are communicated between one or more MSs in one or more of the plurality of adjacent sectors and one or more BSs of the one or more of the plurality of adjacent sectors. For example, MS 140 communicates an OFDM tile to BS 130.

Further, the one or more OFDM tiles include one or more sequences of the plurality of sequences assigned to the plurality of adjacent sectors. For example, MS 140 in sector 110 communicates an OFDM tile, which includes the sequence (1 −1 −1 1) allocated to sector 110, to BS 130. Similarly, MS 142 in sector 114 communicates an OFDM tile, which includes the sequence (1 1 1 1) allocated to sector 114, to BS 132. As the sequences assigned to sector 110 and sector 114 (which are adjacent across adjacent cells) are unique and orthogonal, therefore, interference caused by MS 140 in the communication between MS 142 and BS 132 is minimized. Similarly, interference caused by MS 142 in the communication between MS 140 and BS 130 is minimized.

Thus, each of the plurality of sequences assigned to the plurality of adjacent sectors across plurality of adjacent cells is unique. Further, as the plurality of sequences are orthogonal, interference caused by one or more of the one or more MSs in a sector of the one or more of the plurality of adjacent sectors and the one or more BSs of the plurality of adjacent sectors is minimized. Therefore, subsequent to an allocation of a sequence to a sector, the sequence is communicated between one or more MSs in the sector and a BS serving the sector while minimizing interference from a MS in an adjacent sector and a BS of the adjacent sector.

Figure 4:
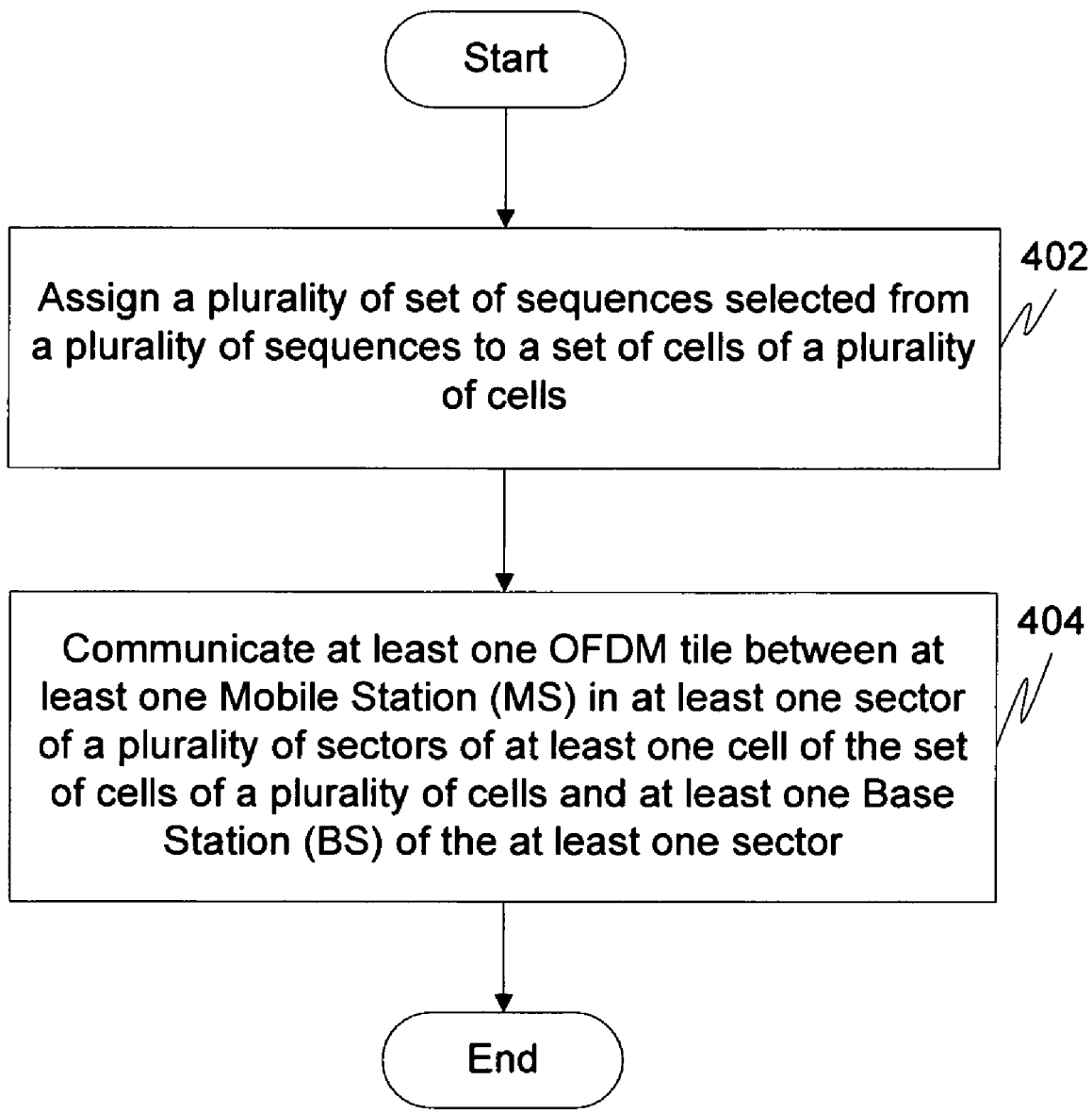
FIG. 4 is a flow chart of a method of communication in an OFDMA communication system, in accordance with another embodiment of the invention.

FIG. 4 is a flow chart of a method of communication in OFDMA communication system 100, in accordance with another embodiment of the invention. OFDMA communication system 100 includes a plurality of cells, which further include a plurality of sectors. At step 402, a plurality of sets of sequences selected from a plurality of sequences are assigned to a set of cells of the plurality of cells. For example, a first set of sequence is allocated to cell 102 and a second set of sequence is allocated to cell 104. The size of a set of sequences of the plurality of sets of sequences may be equal to the number of sectors in each cell of the set of cells. For example, each of cell 102 and cell 104 have three sectors each, therefore, the number of sequences in the first set of sequences and the second sets of sequences will be three.

The plurality of sequences are orthogonal to each other, therefore, sequences in each of the plurality of sets of sequences are also orthogonal to each other. Each set of the plurality of sets of sequences is unique. Also, each sequence in a set of sequences of the plurality of sets of sequences may be unique. For example, the first set of sequences includes three unique sequences, i.e., the sequence (1 1 1 1), the sequence (1 −1 1 −1), and the sequence (1 1 −1 −1). Similarly, a second set of sequence includes three unique sequences, i.e., the sequence (1 1 1 1), the sequence (1 −1 −1 1), and the sequence (1 1 −1 −1). As is apparent from the example, the first set of sequences is different from the second set of sequences. Further, to facilitate re-use of sequences in OFDMA communication system 100, two or more sets of sequences of the plurality of sets of sequences may include one or more common sequences. Referring back to the example given above, the first set of sequences and the second set of sequences have two common sequences, i.e., the sequence (1 1 1 1) and the sequence (1 1 −1 −1). This allows the re-use of sequence in OFDMA communication system 100.

The set of cells, which are allocated the plurality of sets of sequences, may be adjacent to each other. In this case, the allocation of sequences to adjacent cells is done such that, adjacent sectors across the adjacent cells are allocated unique sequence. Allocation of sequences to adjacent sectors has been explained in detail in conjunction with FIG. 3 given above. For example, cell 102 and cell 104 are adjacent. The first set of sequence is allocated to cell 102, such that, sector 108 is allocated the sequence (1 1 1 1), sector 112 is allocated the sequence (1 1 −1 −1), and sector 110 is allocated the sequence (1 −1 1 −1). The second set of sequences is allocated to cell 104, such that, sector 114 is allocated the sequence (1 −1 −1 1), sector 116 is allocated the sequence (1 1 1 1), and the sector 118 is allocated sequence (1 1 −1 −1). As is apparent from the example, sector 110 and sector 114 which are adjacent are allocated different sequences.

Subsequent to the assignment of the plurality of sets of sequences to the set of cells of the plurality of cells, one or more OFDM tiles are communicated between one or more MSs in one or more sectors of the plurality of cells and one or more BSs of the one or more sectors, at step 404. An OFDM tile of the one or more OFDM tiles may be one or more of an Up-link (UL) Partial Usage of Sub-channels (PUSC) tile and a down-link (DL) PUSC cluster compliant with IEEE 802.16e. Additionally, an OFDM tile of the one or more OFDM tiles may be one or more of an Up-link (UL) Band AMC (BAMC) tile and a down-link BAMC cluster compliant with IEEE 802.16e.

The one or more OFDM tiles include one or more sequences of the plurality of sequences allocated to the one or more sectors. In an embodiment, an OFDM tile of the one or more OFDM tiles includes one or more of a plurality of pilot sub-carriers and a plurality of data sub-carriers. In this case, a sequence of the one or more sequences may be embedded in the plurality of pilot sub-carriers. Additionally, the number of sequences in the plurality of sequences is equal to the number of pilot sub-carrier in the OFDM tile. Further, the number of symbols in each sequence of the one or more sequence is equal to the number of pilot sub-carriers in the OFDM tile. For example, a UL-PUSC tile includes four pilot sub-carriers and eight data sub-carriers. Therefore, a sequence of the one or more sequences is embedded in the four pilot sub-carriers. Further, in this example, the number of sequences in the plurality of sequences is four and the number of symbols in each sequence of the one or more sequences is four. As another example, a UL-BAMC tile includes six pilot sub-carriers. Accordingly, the number of sequences in the plurality of sequences is six. In an embodiment, a sequence of the plurality of sequences embedded in one or more of a UL-PUSC tile and DL-PUSC cluster is different from a sequence of the plurality of sequences allocated to one or more of a UL-BAMC tile and DL-BAMC cluster.

The one or more OFDM tiles include one or more sequences of the plurality of sequences assigned to the set of cells of the plurality of cells. More specifically, an OFDM tile of the one or more OFDM tiles including a sequence of the one or more sequences of a set of sequences of the plurality of sets of sequences assigned to a cell of the plurality of cells is communicated between a MS of the one or more MSs in a sector of the one or more sectors of the cell and a BS of the sector. For example, the sequence (1 1 1 1) may be assigned to sector 108 and the sequence (1 −1 1 −1) may be assigned to sector 110. Subsequently, MS 138 may communicate an OFDM tile including the sequence (1 1 1 1) to BS 128. Further, MS 140 may communicate an OFDM tile including the sequence (1 −1 1 −1) to BS 130.

In an embodiment, one or more OFDM tiles are communicated between one or more MSs in one or more sectors of the plurality of cells and one or more BSs of the one or more sectors in order to estimate one or more channels between the one or more MSs and the one or more BSs. This is further explained in detail in conjunction with FIG. 5.

FIG. 5 is a flow chart of a method for channel estimation in OFDMA communication system 100, in accordance with another embodiment of the invention. OFDMA communication system 100 includes a plurality of cells. OFDMA communication system 100 further includes a plurality of sectors. In an embodiment, a cell of the plurality of cells includes the plurality of sectors. In another embodiment, the plurality of cells include the plurality of sectors. In OFDMA communication system 100, one or more OFDM tiles are communicated between one or more MSs in one or more sectors of the plurality of sectors and one or more BSs of the one or more sectors. The one or more OFDM tiles include one or more sequences of the plurality of sequences allocated to the one or more sectors. This has been explained in conjunction with FIG. 2 given above.

Thereafter, at step 502, an OFDM tile of one or more OFDM tiles is received in a sector of the one or more sectors. The OFDM tile may be received by one or more of the one or more MSs and the one or more BSs. For example, the OFDM tile may be transmitted by MS 140 and may be received by BS 130.

The OFDM tile includes a sequence of the one or more sequences. For example, the OFDM tile received by BS 130 includes the sequence (1 −1 −1 1) allocated to sector 110. If the OFDM tile includes one or more of plurality of pilot sub-carriers and plurality of data sub-carriers, the sequence may be embedded in the plurality of pilot sub-carriers. More specifically, if the OFDM tile is an Up-link (UL) Partial Usage of Sub-channels (PUSC) tile compliant with IEEE 802.16e, then the sequence of the one or more sequences may be embedded in the four pilot sub-carriers of the UL-PUSC tile. Alternatively, if the OFDM tile is an Up-link (UL) Band AMC (BAMC) tile compliant with IEEE 802.16e, then the sequence of the one or more sequences may be embedded in the six pilot sub-carriers of the UL-BAMC tile. Further, in an embodiment, a sequence of the one or more sequences embedded in one or more of a UL-PUSC tile and DL-PUSC cluster is different from a sequence of the plurality of sequences embedded in one or more of a UL-BAMC tile and DL-BAMC cluster.

After receiving the OFDM tile, which includes a sequence embedded in the plurality of pilot sub-carriers, a channel estimate is obtained by performing an inner product between the plurality of pilot sub-carriers of the OFDM tile and a sequence allocated to the sector, at step 504. More specifically, an inner product is performed between the plurality of pilot sub-carriers of the OFDM tile and the sequence allocated to the sector. The inner product may be performed at the one or more MSs and the one or more BSs. For example, an inner product is performed at BS 130 in sector 110 between the plurality of pilot sub-carriers embedded with the sequence (1 −1 −1 1) in the OFDM tile received by BS 130 and the sequence (1 −1 −1 1) allocated to sector 110. BS 130 may receive an OFDM tile from MS 140. In this case, the OFDM tile received from MS 140 in sector 110 includes the sequence (1 −1 −1 1) embedded on the plurality of pilot sub-carriers of the OFDM tile. The sequence (1 −1 −1 1) is allocated to sector 110. As a result, an inner product of the plurality of pilot sub-carriers embedded with the sequence (1 −1 −1 1) and the sequence (1 −1 −1 1) allocated to sector 110, results in the channel estimate.

However, BS 130 may also receive an OFDM tile from MS 138. In this case, the OFDM tile received from MS 138 in sector 108 includes the sequence (1 1 1 1) embedded in a plurality of pilot sub-carriers of the OFDM tile. The sequence (1 1 1 1) is allocated to sector 108. As a result, an inner product between the plurality of pilot sub-carriers embedded with the sequence (1 1 1 1) and the sequence (1 −1 −1 1) allocated to sector 110 theoretically produces a null-value, thereby, nullifying the interference received from the OFDM tile transmitted by MS 138. Thus, performing an inner product between an OFDM tile received from an interfering MS and a sequence of the plurality of sequences allocated to the sector minimizes interference.

In an embodiment, if an OFDM tile of the one or more OFDM tiles in a cell of the plurality of cells is multiplied by a PRBS allocated to the cell, then before performing the inner product between the plurality of pilot sub-carriers embedded with a sequence of the plurality of sequences in the OFDM tile and the sequence, de-PRBS is done on the OFDM tile. As a result, the interference in one or more sectors of the plurality of sectors may be minimized.

Thereafter, at step 506, one or more channels between a MS of the one or more MSs and a BS of the one or more BSs in the sector are estimated. Estimation of the one or more channels may, for example, be based on a result of inner product between the plurality of pilot sub-carriers embedded with a sequence of the plurality of sequences in the OFDM tile and a sequence allocated to the sector. For example, an up-link channel between MS 140 and BS 130 may be estimated at BS 130 based on a result of an inner product between the plurality of pilot sub-carriers embedded with the sequence (1 −1 −1 1) in the OFDM tile received from MS 140 and the sequence (1 −1 −1 1) allocated to sector 110. Similarly, a down-link channel between MS 140 and BS 130 may be estimated at MS 140.

Thus, orthogonality among plurality of sequences allocated to plurality of sectors in OFDMA communication system 100 leads to improvement in estimation of channel between a MS and a BS in the presence of interference from MSs and BSs in one or more of adjacent cells and adjacent sectors in OFDMA communication system 100.

Figure 6:
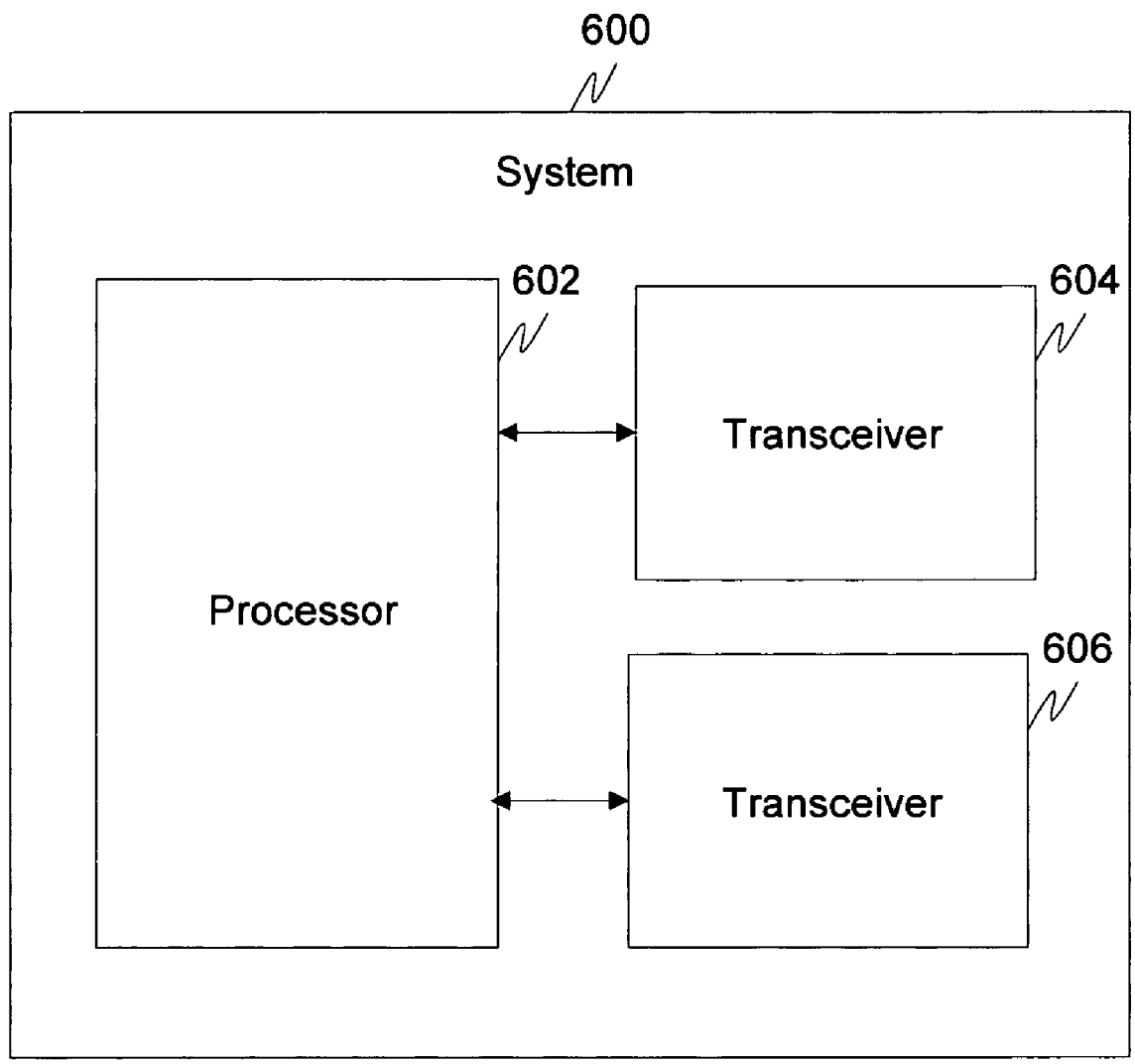
FIG. 6 is a block diagram illustrating a system for communication in an OFDMA communication system, in accordance with an embodiment of the invention.

FIG. 6 is a block diagram of a system 600 for communication in OFDMA communication system 100, in accordance with an embodiment of the invention. OFDMA communication system 100 includes a plurality of cells. System 600 includes a processor 602 and one or more transceivers (such as, transceiver 604 and a transceiver 606). Processor 602 allocates a plurality of sequences to a plurality of sectors. The plurality of sequences are orthogonal to each other. In an embodiment, a cell of the plurality of cells includes the plurality of sectors. This has been explained in detail in conjunction with FIG. 2 given above.

In an embodiment, the plurality of cells include the plurality of sectors. Further, a plurality of adjacent cells exist in the plurality of cells. In other words, two or more cells in the plurality of cells are adjacent. In this case, processor 602 assigns the plurality of sequences to the plurality of adjacent sectors across a plurality of adjacent cells. The plurality of cells includes the plurality of adjacent cells. In this case, each sequence of the plurality of sequence is unique. This has been explained in detail in conjunction with FIG. 3 given above.

In another embodiment, processor 602 assigns a plurality of sets of sequences selected from a plurality of sequences to a set of cells of the plurality of cells. Each set of sequences of the plurality of sets of sequences is unique. Additionally, the size of a set of sequences of the plurality of sets of sequences may be equal to the number of sectors in each cell of the set of cells. This has been explained in detail in conjunction with FIG. 4 given above.

After allocation of the plurality of sequences, the one or more transceivers communicate one or more OFDM tiles between one or more MSs in one or more sectors of the plurality of sectors and one or more BSs of the one or more sectors. This has been explained in conjunction with FIG. 2. A transceiver of the one or more transceivers may be located on a MS of the one or more MSs and a BS of the one or more BSs. For example, transceiver 604 is located on MS 140 and transceiver 604 transmits one or more of the one or more OFDM tiles in sector 110.

Thereafter, one of the one or more transceivers receives an OFDM tile of the one or more OFDM tiles in a sector of the one or more sector. The OFDM tile includes a sequence of the plurality of sequences embedded in a plurality of pilot sub-carriers of the OFDM tile. The transceiver may be located on one of a MS of the one or more MS and a BS of the one or more BSs. For example, transceiver 604 may be located on BS 140 and transceiver 604 receives one or more of the one or more OFDM tiles in sector 110. After receiving the OFDM tile by one of the one or more transceivers, processor 602 performs an inner product between the plurality of pilot sub-carriers embedded with the sequence in the OFDM tile and a sequence allocated to the sector. This has been explained in detail in conjunction with FIG. 5 given above.

Figure 7:
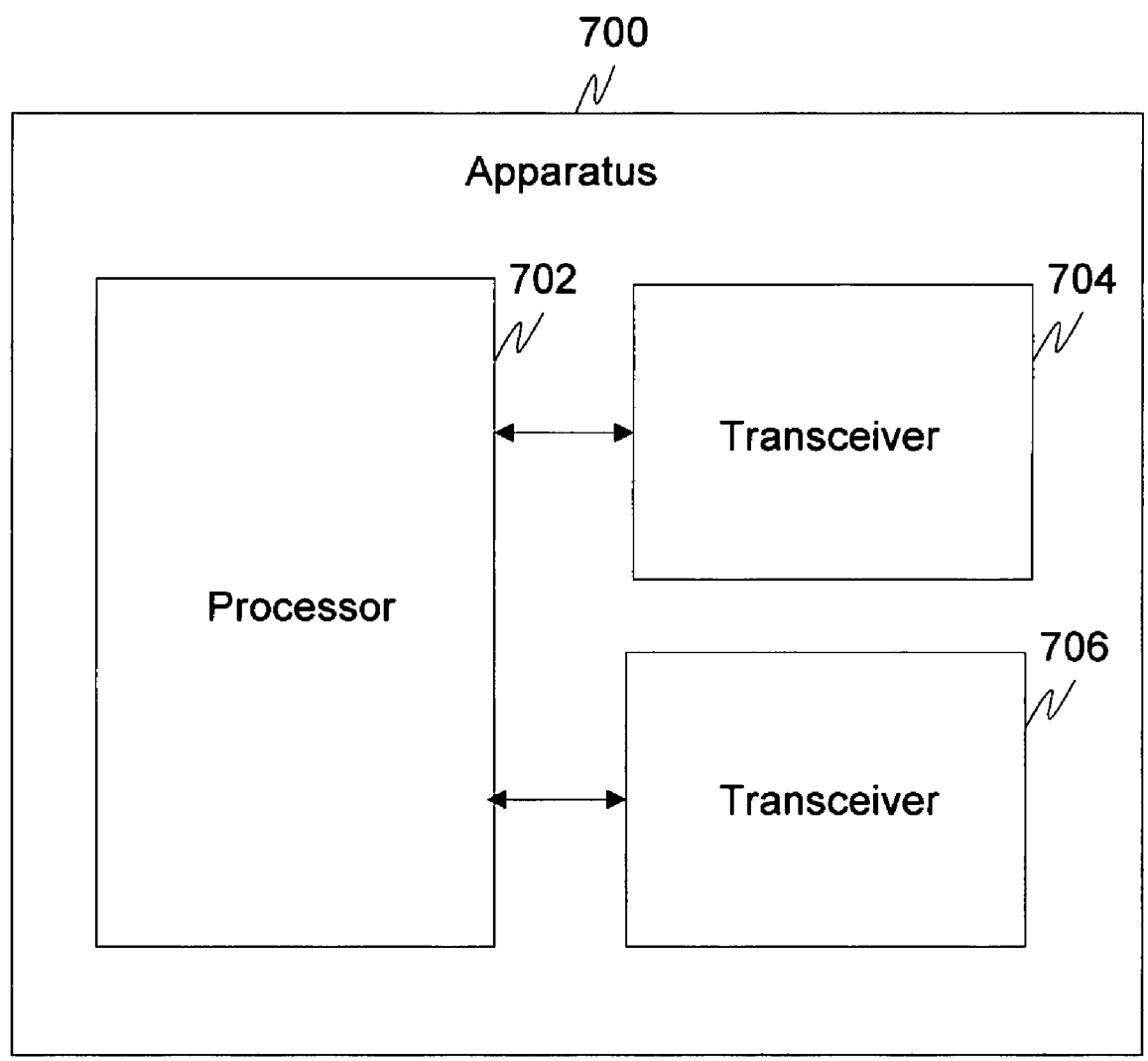
FIG. 7 is a block diagram illustrating an apparatus for communication in an OFDMA communication system, in accordance with an embodiment of the invention.

FIG. 7 is a block diagram of an apparatus 700 for communication in OFDMA communication system 100, in accordance with an embodiment of the invention. OFDMA communication system 100 includes a plurality of cells. Apparatus 700 may be a gateway in OFDMA communication system 100. In an embodiment, apparatus 700 may be any network entity in OFDMA communication system 100. Apparatus 700 includes a processor 702 and one or more transceivers (such as, transceiver 704 and a transceiver 706). Processor 702 allocates a plurality of sequences to a plurality of sectors. The plurality of sequences are orthogonal to each other. In an embodiment, a cell of the plurality of cells includes the plurality of sectors. This has been explained in detail in conjunction with FIG. 2 given above.

After allocation of the plurality of sequences, the one or more transceivers communicate one or more OFDM tiles between one or more MSs in one or more sectors of the plurality of sectors and one or more BSs of the one or more sectors. This has been explained in conjunction with FIG. 2. In an embodiment, apparatus 700 may be a MS of the one or more MSs. In another embodiment, apparatus 700 may be a BS of the one or more BSs.

Figure 8A:
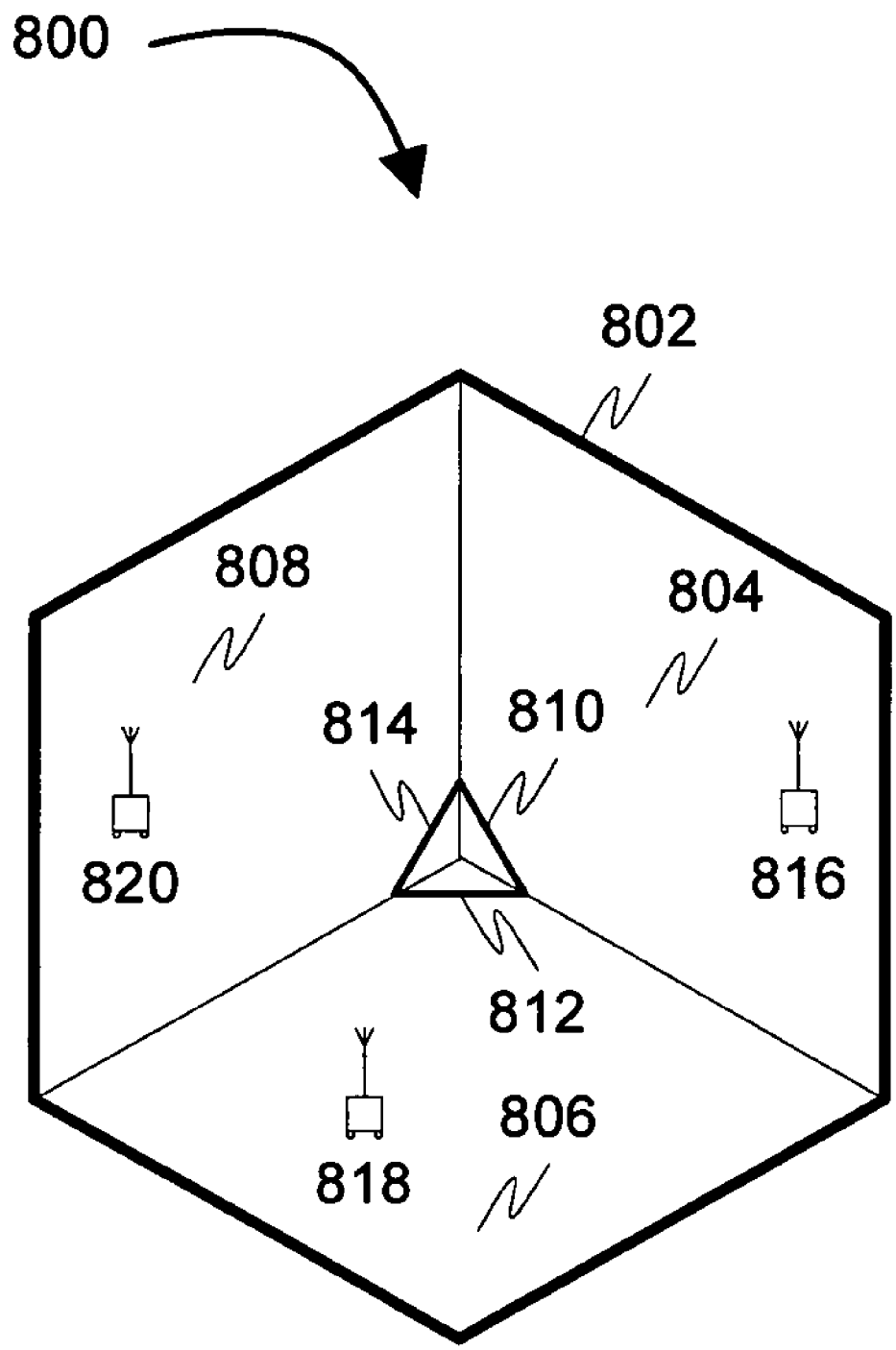
FIGS. 8A and 8B illustrate a method of allocating three sequences in an OFDMA communication system, in accordance with an exemplary embodiment of the invention.

FIG. 8A illustrates a method of allocating three sequences in an OFDMA communication system 800, in accordance with an exemplary embodiment of the invention. OFDMA communication system 800 includes a cell 802. Further, cell 802 includes each of a sector 804, a sector 806, and a sector 808. Additionally, cell 802 includes each of a Base Station (BS) 810, a BS 812, and a BS 814. Each of BS 810, BS 812, and BS 814 serve a plurality of MSs in one or more of sector 804, sector 806, and sector 808. For example, a MS 816 in sector 804 is served by BS 810 and a MS 818 in sector 806 is served by BS 812. Similarly, a MS 820 in sector 808 is served by BS 814. Due to frequency re-use in cell 802, MS 816 in sector 804 in and MS 818 in sector 808 use the same OFDM tile for communication. Therefore, while estimating channel between MS 816 and BS 810 at BS 810, BS 810 may experience interference from MS 818, thereby leading to incorrect channel estimation between MS 816 and BS 810.

To avoid this, each of sector 804, sector 806, and sector 808 are allocated three sequences, which are orthogonal to each other. In other words, the inner product between any two sequences of these three sequences is zero. For example, these three sequences may be derived from a Walsh-Hadamard orthogonal matrix: $[(1\ 1\ 1\ 1)(1\ -1\ 1\ -1)(1\ 1\ -1\ -1)(1\ -1\ -1\ 1)]^T$. Sector 804 is allocated the sequence (1 1 1 1), sector 806 is allocated the sequence (1 −1 1 −1), and sector 808 is allocated the sequence (1 1 −1 −1). Therefore, not only each of these three sequences allocated in cell 802 are orthogonal to each other, but they are also unique.

After allocating these three sequences to sector 804, sector 806, and sector 808, a first OFDM tile is communicated from MS 816 to BS 810. The first OFDM tile includes the sequence (1 1 1 1) allocated to sector 804. Similarly, a second OFDM tile is communicated from MS 818 to BS 812. The second OFDM tile includes the sequence (1 −1 1 −1) allocated to sector 806.

As each of the first OFDM tile and the second OFDM is an Up-link (UL) Partial Usage of Sub-channels (PUSC) tile compliant with IEEE 802.16e, therefore, each of the first OFDM tile and the second OFDM tile includes four pilot sub-carriers. Thus, the sequence (1 1 1 1) is embedded on the four pilot sub-carriers of the first OFDM tile and the sequence (1 −1 1 −1) is embedded on the four pilot sub-carriers of the second OFDM tile.

As a result of embedding the sequence (1 1 1 1) in four pilot sub-carriers of the first OFDM tile, an up-link channel between MS 816 and BS 810 may be estimated. In order to estimate the up-link channel between MS 816 and BS 810, BS 810 receives the first OFDM tile. Thereafter, an inner product is performed between the four pilot sub-carriers embedded with the sequence (1 1 1 1) of the first OFDM tile and the sequence (1 1 1 1) allocated to sector 804 at BS 810. Since the first OFDM tile is communicated by MS 816 in sector 804, the sequence (1 1 1 1) is embedded in the four pilot carriers of the first OFDM tile. Therefore, an inner product between (1 1 1 1) and (1 1 1 1) theoretically produces a value 1 as shown below:

$$<(1\ 1\ 1\ 1), (1\ 1\ 1\ 1)> = ((1\times1)+(1\times1)+(1\times1)+(1\times1))/4 = 1.$$

As a result, the up-link channel can be estimated. However, while receiving the first OFDM tile at BS 810, BS 810 may also receive the second OFDM tile. Since the second OFDM tile is communicated by MS 818, the sequence (1 −1 1 −1) is embedded in the four pilot sub-carriers of the second OFDM tile. Consequently, when an inner product between (1 1 1 1) and (1 −1 1 −1) is performed at BS 810 produces a theoretical value of zero, as a result of this, the second OFDM tile is nullified. This is illustrated mathematically as given below:

$$\underline{y} = h \underline{x}_1 + g_2 \underline{x}_2 + g_3 \underline{x}_3 + \underline{n} \quad (8)$$

where,
- $\underline{y}$ is the signal corresponding to pilot sub-carriers of an OFDM tile received at a BS from a first MS in a sector served by the BS,
- h is the channel between the first MS and the BS, which is constant through the OFDM tile,
- $g_2$ is the channel between a second MS of a first adjacent sector and the BS
- $g_3$ is the channel between a third MS of a second adjacent sector and the BS
- $\underline{x}_1$ is the orthogonal pilot sequence embedded in the OFDM tile transmitted by the first MS
- $\underline{x}_2$ is the orthogonal pilot sequence embedded in the OFDM tile transmitted by the second MS
- $\underline{x}_3$ is the orthogonal pilot sequence embedded in the OFDM tile transmitted by the third MS
- $\underline{n}$ is the noise in the channel An estimate of the up-link channel between the first MS and the BS, represented by $h_{est}$, is given below:

$$\begin{aligned} h_{est} &= <\underline{y}, \underline{x}_1>/4 \\ &= <(h\underline{x}_1 + g_2\underline{x}_2 + g_3\underline{x}_3 + \underline{n}), \underline{x}_1>/4 \\ &= h + <\underline{n}, \underline{x}_1>/4 \end{aligned} \quad (9)$$

Therefore, as a result of orthogonality between sequences allocated to adjacent sectors, improved channel estimation can be performed.

Figure 8B:
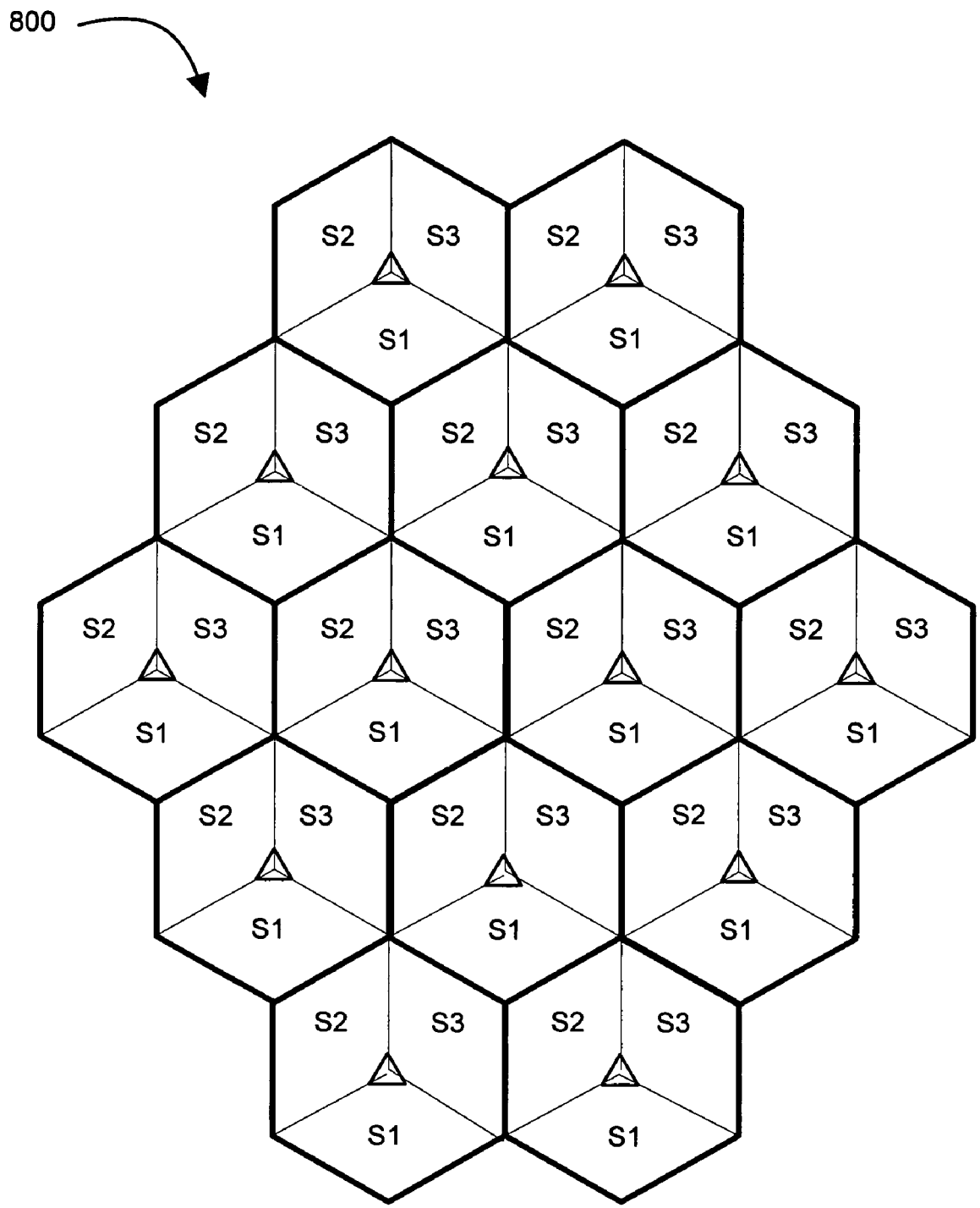

FIG. 8B illustrates a method of allocating three sequences in an OFDMA communication system 822, in accordance with another exemplary embodiment of the invention. OFDMA communication system 822 includes a plurality of cells as depicted in FIG. 8B. Additionally, each cell of the plurality of cells includes three sectors. Each sector of each cell of the plurality of cells is served by one or more BSs. Further, each cell is allocated the set of sequences {S1, S2, S3}. The set of sequences are orthogonal to each other. In other words, the inner product between any two sequences in the set of sequences {S1, S2, S3} is zero. More specifically, each sector of a cell of the plurality of cells is allocated a unique sequence from the set {S1, S2, S3}. As a result, sequences allocated to adjacent sectors in each cell of the plurality of cells are orthogonal. Further, as a result of the allocation as depicted, sequences allocated to adjacent sectors across adjacent cells are also orthogonal. Therefore, interference from one or more of an MS and a BS in adjacent sectors is minimized.

Figure 9A:
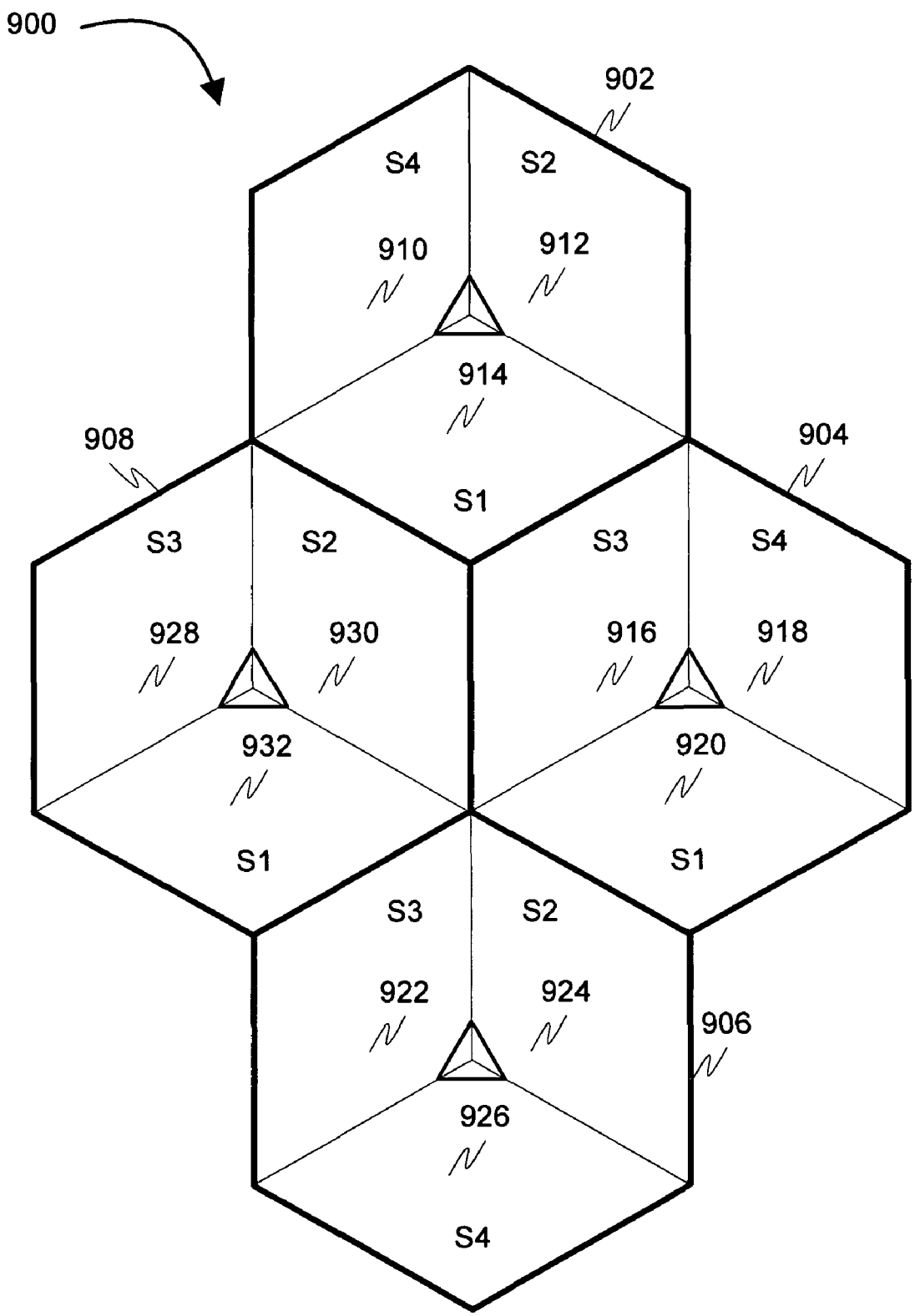
FIGS. 9A, 9B, and 9C illustrates a method of allocating four sequences in an OFDMA communication system, in accordance with an exemplary embodiment of the invention.

FIG. 9A illustrates a method of allocating four sequences in an OFDMA communication system 900, in accordance with an exemplary embodiment of the invention. OFDMA communication system 900 includes each of a cell 902, a cell 904, a cell 906, and a cell 908. Further, each of cell 902, cell 904, cell 906 and cell 908 includes three sectors and three BSs. Cell 902 includes a sector 910, a sector 912, and a sector 914 and cell 904 includes a sector 916, a sector 918, and a sector 920. Similarly, cell 906 includes each of a sector 922, a sector 924, and a sector 926 and cell 908 includes each of a sector 928, a sector 930, and a sector 932.

Each sector of cell 902, cell 904, cell 906, and cell 908 is allocated a sequence from a four sequences, derived from a Walsh-Hadamard orthogonal matrix: $[(1\ 1\ 1\ 1)\ (1\ -1\ 1\ -1)\ (1\ 1\ -1\ -1)\ (1\ -1\ -1\ 1)]^T$. Each sequence of the Walsh-Hadamard matrix is generally represented as SN, where N may be one of 1, 2, 3 and 4. More specifically, S1 represents the sequence (1 1 1 1), S2 represents the sequence (1 −1 1 −1), S3 represents the sequence (1 1 −1 −1) and S4 represents the sequence (1 −1 −1 1).

As depicted in FIG. 9, the sequence S1 is allocated to each of sector 914, sector 920, and sector 932. The sequence S2 is allocated to each of sector 912, sector 924 and sector 930. The sequence S3 is allocated to each of sector 916, sector 922, and sector 928. The sequence S4 is allocated to each of sector 910, sector 918, and sector 926. As a result of this allocation, sequences allocated to a cell are unique. For example, each sequence in the set of sequences {S1, S4, S2} allocated to cell 902 are unique. Further, sequences allocated to adjacent sectors are also unique. For example, sector 914, sector 916, and sector 930 are adjacent sectors are allocated sequences S1, S2, and S3 respectively, which are unique.

Further, to facilitate re-use of these four sequences in OFDMA communication system 900, set of sequences allocated to adjacent cells may have one or more common sequences. For example, the set of sequences allocated to cell 902 and the set of sequences allocated to cell 904 have the sequence S1 and the sequence S4 in common. Additionally, one or more sequences in two or more sets of sequences may be uncommon. For example, the sequence S4 is uncommon between the set of sequences allocated to cell 904 and set of sequence allocated to cell 908.

As a result of the allocation depicted in FIG. 9, two or more sequences of the four sequences allocated to two or more adjacent sectors are unique. Further, since the plurality of sequences are orthogonal to each other, interference between adjacent sectors is minimized.

Figure 9B:
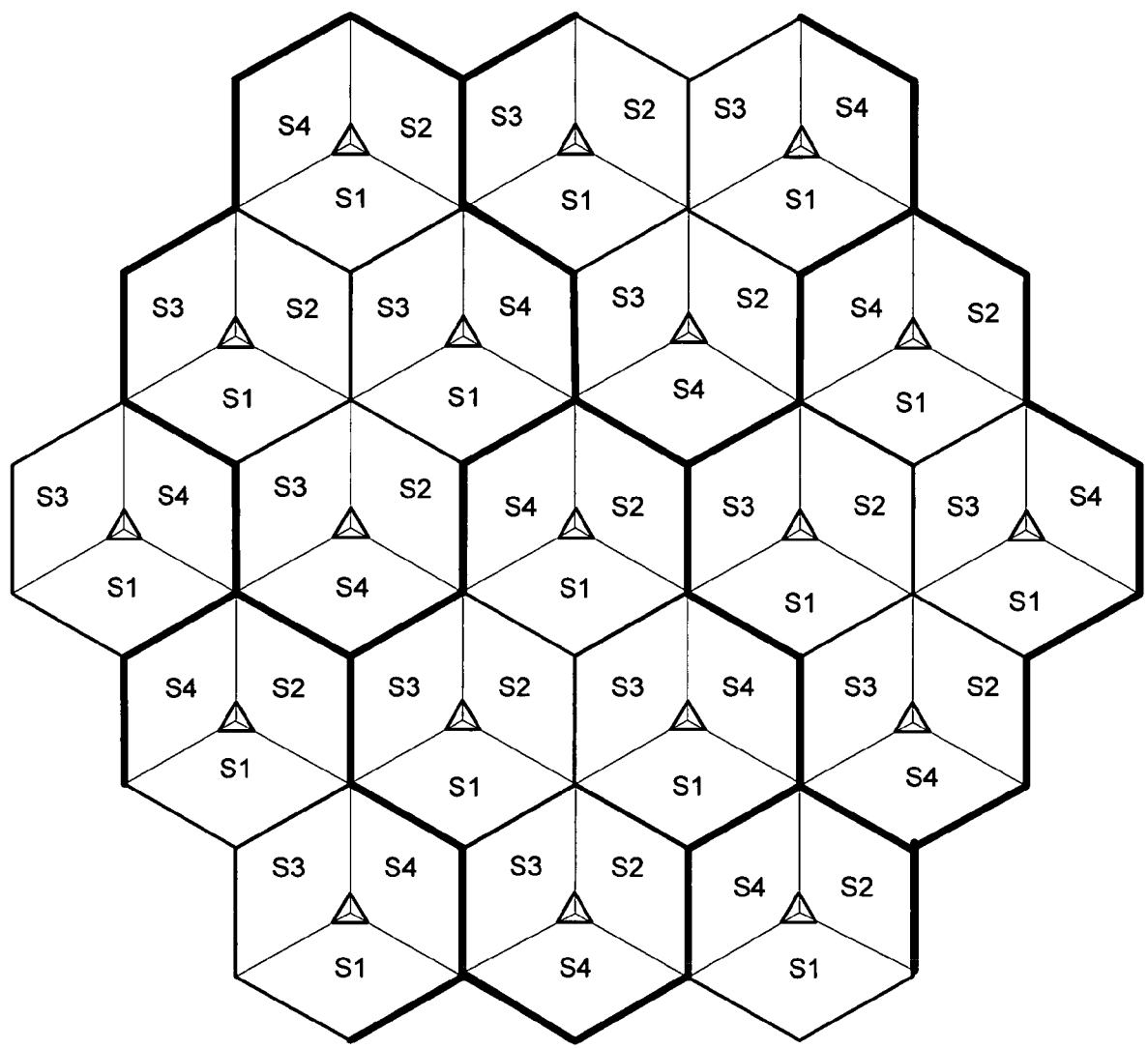

FIG. 9B illustrates a method of allocating four sequences in an OFDMA communication system 934, in accordance with another exemplary embodiment of the invention. OFDMA communication system 934 includes a plurality of cells. Each of the plurality of cells includes three sectors. Further, each sector of each cell of the plurality of cells is served by one or more BSs. As depicted, three sequences from the set of sequences {S1, S2, S3, S4} is allocated to each cell of the plurality of cells. The set of sequences {S1 S2 S3 S4} are orthogonal to each other. In other words, the inner product between any two sequences in the set of sequences {S1, S2, S3, S4} is zero.

Further as depicted three sequences allocated to a cell of the plurality of cells are unique. In other words, adjacent sectors of each cell of the plurality of cells are allocated orthogonal sequences. Additionally, sequences allocated to adjacent sectors across adjacent cells are also unique. As a result, interference from one or more of a MS and a BS from adjacent sectors are minimized.

Figure 9C:
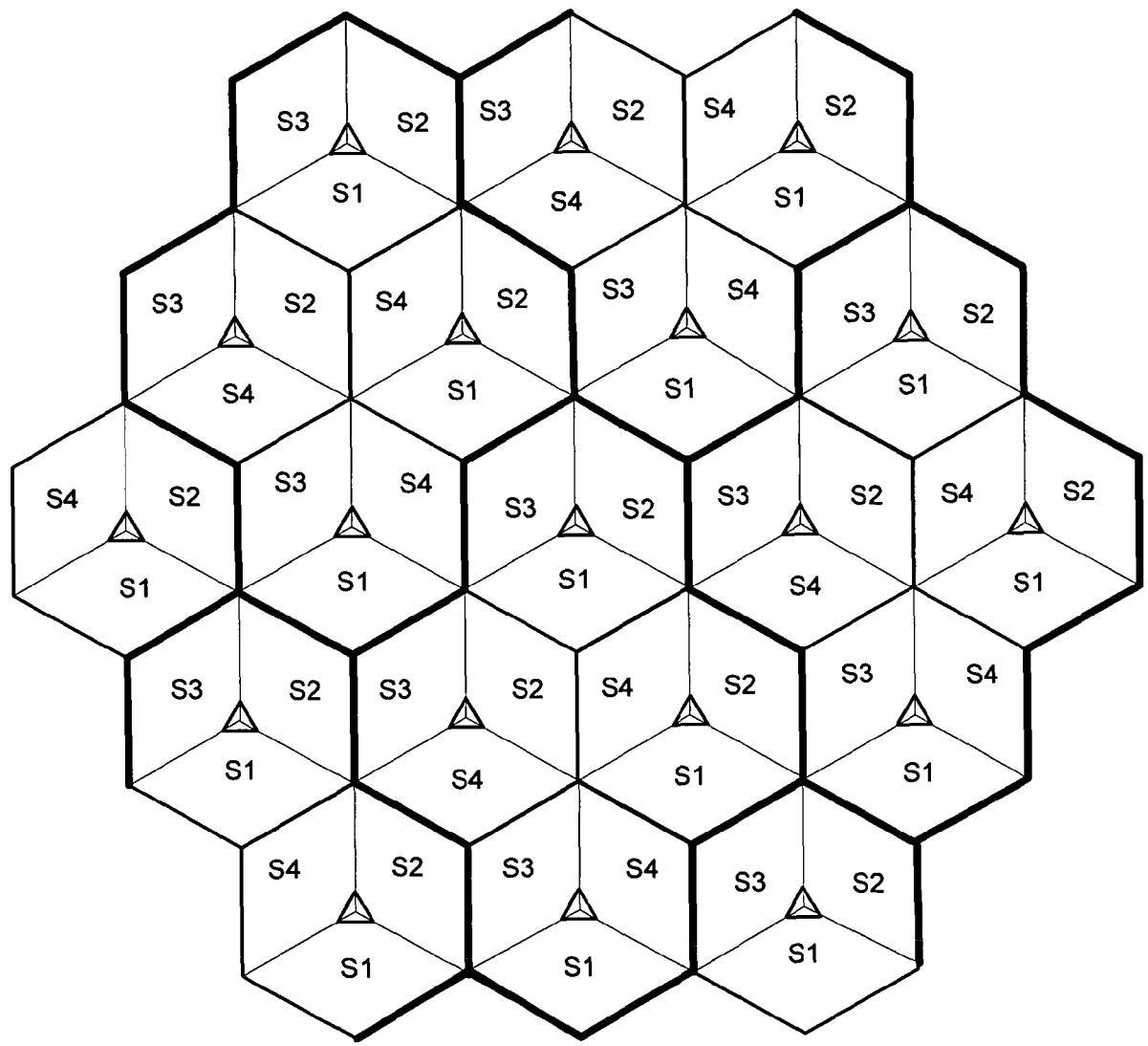

FIG. 9C illustrates a method of allocating four sequences in an OFDMA communication system 936, in accordance with another exemplary embodiment of the invention.

Figure 10:
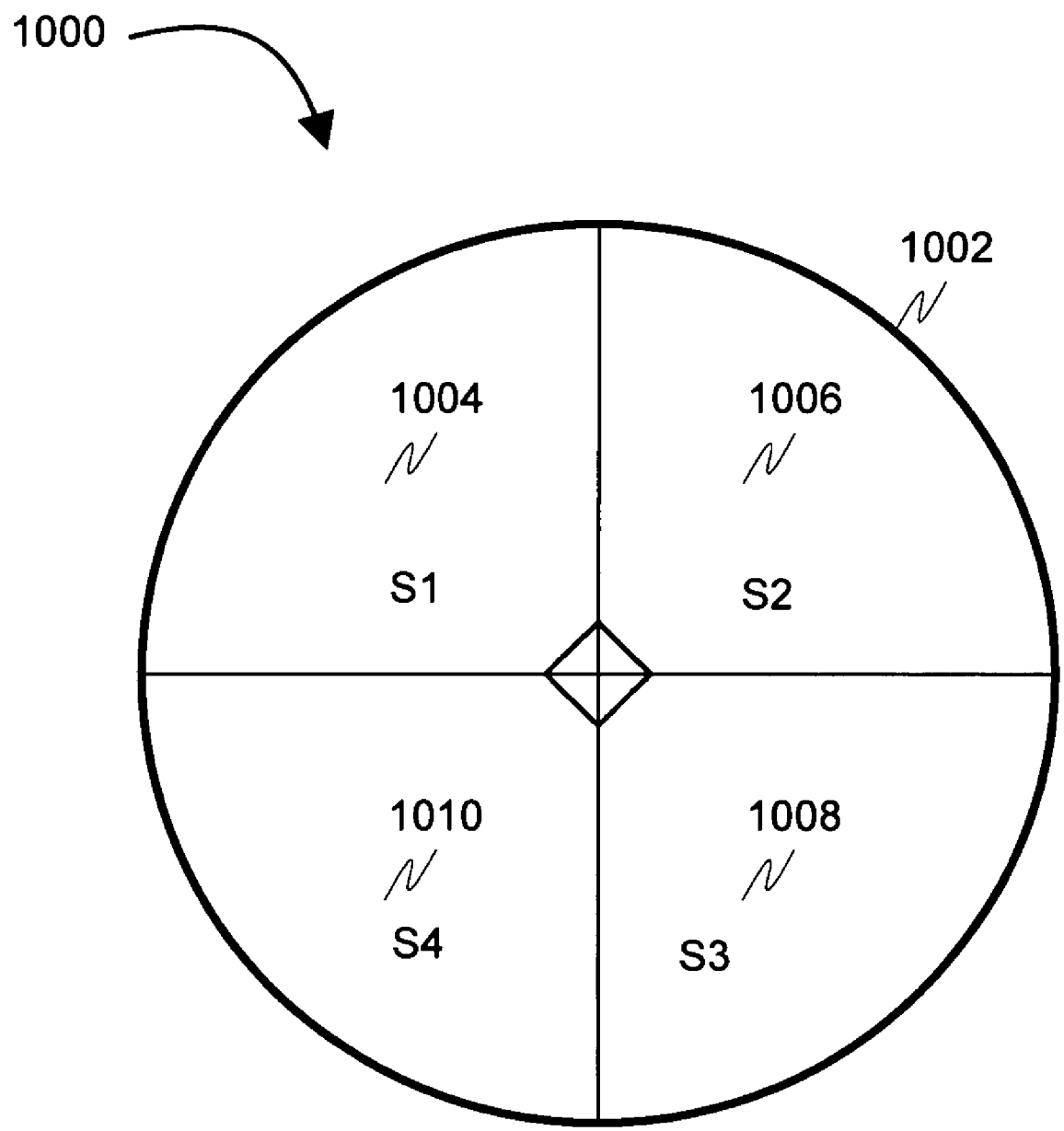
FIG. 10 illustrates a method of allocating four sequences in an OFDMA communication system, in accordance with another exemplary embodiment of the invention.

FIG. 10 illustrates a method of allocating four sequences in an OFDMA communication system 1000, in accordance with another exemplary embodiment of the invention. OFDMA communication system 1000 includes a cell 1002. Cell 1002 further includes each of a sector 1004, a sector 1006, a sector 1008 and a sector 1010. Each of sector 1004, sector 1006, sector 1008, and sector 1010 are allocated a sequence from the set of sequences {S1, S2, S3, S4}. The set of sequences are orthogonal to each other. In other words, the inner product between any two sequences in the set of sequences {S1, S2, S3, S4} is zero. Further, each sequence allocated to each of sector 1004, sector 1006, sector 1008, and sector 1010 is unique. As a result, sequences allocated to adjacent sectors of cell 1002 are orthogonal. Consequently, interference from one or more of a MS and a BS in adjacent cells is minimized.

Various embodiments of the invention disclosed above provide an improved method of allocating a plurality of sequences to a plurality of sectors. Since the plurality of sequences are orthogonal, and adjacent sectors are allocated unique sequences, interference from one or more of an MS and a BS in adjacent sectors is minimized.

Those skilled in the art will realize that the above recognized advantages and other advantages described herein are merely exemplary and are not meant to be a complete rendering of all of the advantages of the various embodiments of the invention.

In the foregoing specification, specific embodiments of the invention have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of the invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the dependency of this application and all equivalents of those claims as issued.

What is claimed is:

1. A method of estimating a channel in a cellular network based on an interference corrupted pilot sequence, the method comprising:
   receiving the interference corrupted pilot sequence comprising a first pilot sequence transmitted from a first device and interference from a second pilot sequence transmitted from a second device;
   generating an inner product between the interference corrupted pilot sequence and the first pilot sequence; and
   estimating the channel according to the inner product between the interference corrupted pilot sequence and the first pilot sequence,
   wherein the first device is in a first sector of the cellular network, the second device is in a second sector of the cellular network, and the first sector is adjacent to the second sector,
   wherein the first pilot sequence is orthogonal to the second pilot sequence such that an inner product between the first pilot sequence and the second pilot sequence is zero.

2. The method of claim 1, wherein the first pilot sequence is allocated to devices in the first sector and the second pilot sequence is allocated to devices in the second sector.

3. The method of claim 1, wherein receiving the interference corrupted pilot sequence further comprises:
   receiving the interference corrupted pilot sequence over pilot sub-carriers in an orthogonal frequency division multiplexing (OFDM) tile.

4. The method of claim 3, wherein the OFDM tile is an Up-link (UL) Partial Usage of Sub-channels (PUSC) tile or a down-link (DL) PUSC tile.

5. The method of claim 1, further comprising:
   prior to generating the inner product between the interference corrupted pilot sequence and the first pilot sequence, multiplying the interference corrupted pilot sequence by a pseudo random binary sequence (PRBS) allocated to the first sector.

6. The method of claim 5, further comprising:
   allocating the PRBS to the first device.

7. The method of claim 1, further comprising:
   allocating the first pilot sequence to the first device.

8. The method of claim 1, wherein the first pilot sequence and the second pilot sequence are derived from a Walsh-Hadamard matrix.

9. The method of claim 1, wherein the first pilot sequence and the second pilot sequence are derived from a complex constellation.

10. A system for estimating a channel in a cellular network based on an interference corrupted pilot sequence, the system comprising:
    a transceiver configured to receive the interference corrupted pilot sequence comprising a first pilot sequence transmitted from a first device and interference from a second pilot sequence transmitted from a second device; and
    a processor configured to:
       generate an inner product between the interference corrupted pilot sequence and the first pilot; and
       estimate the channel according to the inner product between the interference corrupted pilot sequence and the first pilot sequence,
    wherein the first device is in a first sector of the cellular network, the second device is in a second sector of the cellular network, and the first sector is adjacent to the second sector,
    wherein the first pilot sequence is orthogonal to the second pilot sequence such that an inner product between the first pilot sequence and the second pilot sequence is zero.

11. The system of claim 10, wherein the first pilot sequence is allocated to devices in the first sector and the second pilot sequence is allocated to devices in the second sector.

12. The system of claim 10, wherein the transceiver is further configured to receive the interference corrupted pilot sequence over pilot sub-carriers in an orthogonal frequency division multiplexing (OFDM) tile.

13. The system of claim 12, wherein the OFDM tile is an Up-link (UL) Partial Usage of Sub-channels (PUSC) tile or a down-link (DL) PUSC tile.

14. The system of claim 10, wherein the processor is further configured to multiply the interference corrupted pilot sequence by a pseudo random binary sequence (PRBS) allocated to the first sector prior to generating the inner product between the interference corrupted pilot sequence and the first pilot sequence.

15. The system of claim 14, wherein the processor is further configured to allocate the PRBS to the first device.

16. The system of claim 10, wherein the processor is further configured to allocate the first pilot sequence to the first device.

17. The system of claim 10, wherein the first pilot sequence and the second pilot sequence are derived from a Walsh-Hadamard matrix.

18. The system of claim 10, wherein the first pilot sequence and the second pilot sequence are derived from a complex constellation.

* * * * *